United States Patent
Choi et al.

(10) Patent No.: US 8,673,085 B2
(45) Date of Patent: Mar. 18, 2014

(54) CONTROLLING METHOD OF DISHWASHER

(75) Inventors: Yog Jin Choi, Seoul (KR); Joon Ho Pyo, Seoul (KR); Seong Ho Kim, Seoul (KR); Yong Youp Han, Seoul (KR); Young Hwan Park, Seoul (KR)

(73) Assignee: LG Electronics Inc., Seoul (KR)

( * ) Notice: Subject to any disclaimer, the term of this patent is extended or adjusted under 35 U.S.C. 154(b) by 243 days.

(21) Appl. No.: 13/226,977

(22) Filed: Sep. 7, 2011

(65) Prior Publication Data

US 2011/0315167 A1    Dec. 29, 2011

Related U.S. Application Data

(62) Division of application No. 12/216,465, filed on Jul. 3, 2008, now abandoned.

(30) Foreign Application Priority Data

Jul. 5, 2007   (KR) ......................... 10-2007-0067547

(51) Int. Cl.
  *B08B 7/04*   (2006.01)
(52) U.S. Cl.
  USPC .............................................. 134/18; 134/26
(58) Field of Classification Search
  None
  See application file for complete search history.

(56) References Cited

U.S. PATENT DOCUMENTS

| | | | |
|---|---|---|---|
| 4,457,323 | A | 7/1984 | Fay et al. |
| 5,904,163 | A | 5/1999 | Inoue et al. |
| 2006/0016020 | A1 * | 1/2006 | Park .................................. 8/158 |

FOREIGN PATENT DOCUMENTS

| | | |
|---|---|---|
| CN | 1183943 A | 6/1998 |
| CN | 101243962 A | 8/2008 |
| DE | 4233936 A1 | 4/1994 |
| JP | 07-067437 | 3/1995 |
| JP | 10165349 A | 6/1998 |
| KR | 1998-068026 A | 10/1998 |
| KR | 10-2004-0078821 | 9/2004 |
| KR | 1020060124284 A | 5/2006 |
| KR | 1020060124285 A | 5/2006 |
| KR | 10-2007-0056284 A | 6/2007 |

* cited by examiner

*Primary Examiner* — Eric Golightly
(74) *Attorney, Agent, or Firm* — McKenna Long & Aldridge, LLP

(57) ABSTRACT

A method for controlling a dishwasher including the steps of first determining a steam operation mode for washing dishes and second determining at least one of a motor rotation speed, a number of repetitions of a steam supply step, a steam washing pattern, and an amount of detergent based on the determined steam operation mode.

6 Claims, 3 Drawing Sheets

CONTROLLING METHOD OF DISHWASHER

This application is a divisional application of U.S. patent application Ser. No. 12/216,465, filed Jul. 3, 2008 now abandoned, which claims the benefit of Korean Patent Application No. 10-2007-0067547, filed on Jul. 5, 2007, which are hereby incorporated by reference for all purposes as if fully set forth herein.

BACKGROUND

The present invention relates to washing apparatuses. More specifically, the present invention relates to a method for controlling a dishwasher that enables washing of dishes in various operation modes based on the kinds of dishes being washed.

In general, a dishwasher washes dishes automatically by removing foreign matter, such as food residue and the like, from surfaces of the dishes by spraying high pressure washing water toward the dishes placed in a washing chamber 150.

One of the most important factors of the dishwasher is its washing performance, which relates to its ability to cleanly remove food residue from the surface of a dish. In order to improve washing performance in a conventional manner, the spray pressure of the washing water used to remove foreign matter from the surface of the dish is increased.

However, if the spray pressure of the washing water is excessively high, the dishes are liable to be damaged and broken. Moreover, the washing of dishes with a high pressure washing water spray results in an increase in an amount of washing water required for dish washing. Furthermore, a high-pressure spray of washing water increases power consumption of the dishwasher's motor, which drives a water pump.

BRIEF SUMMARY OF THE DISCLOSED EMBODIMENTS

To solve the problems, a method for controlling a dishwasher having a feature of enhanced washing performance is presented. Additionally, a method for controlling a dishwasher having a feature of reduction of power consumption for washing the dishes is presented.

To achieve these and other features and in accordance with the purpose of the invention, as embodied and broadly described herein, a method for controlling a dishwasher includes the steps of determining a first steam operation mode for washing dishes, and determining at least one of a motor rotation speed, a number of repetitions of a steam supply step, a steam washing pattern, and an amount of detergent based on the determined steam operation mode.

The steam operation mode may include a first steam operation mode for washing contaminated dishes, and a second steam operation mode wherein the motor rotation speed is slower than the motor rotation speed of the first steam operation mode.

The steam operation mode may include a first steam operation mode for washing contaminated dishes, and a second steam operation mode having a number of repetitions smaller than the number of repetitions in the steam spray step in the first steam operation mode.

The second steam operation mode may include a main washing step and a rinsing step, and the motor rotation speed in the rinsing step may be greater than the motor rotation speed in the main washing step.

The steam operation mode may include a first steam operation mode for washing contaminated dishes, and a second steam operation mode using the amount of detergent smaller than the amount of detergent in the first steam operation mode.

The number of repetitions in the second steam operation mode may be smaller than the number of repetitions in the first steam operation mode.

The amount of detergent may be set in correspondence to the motor rotation speed.

The number of repetitions may be set in correspondence to the amount of detergent or the motor rotation speed.

In another aspect of the present invention, a method for controlling a dishwasher includes the steps of performing a first steam operation mode for washing a first kind of contaminated dishes, and performing a second steam operation mode for washing a second kind of contaminated dishes, different from the first kind of dishes, wherein the steam operation mode is determined based on the kinds of dishes, and the first steam operation mode and the second steam operation mode are different from each other in view of at least one of a motor rotation speed, an amount of detergent, a number of repetitions of a steam supply step, a steam washing pattern.

The motor rotation speed in the second steam operation mode may be smaller than the motor rotation speed in the first steam operation mode.

The number of repetitions of the steam spray step in the second steam operation mode may be smaller than the number of repetitions of the steam spray step in the first steam operation mode.

The amount of detergent in the second steam operation mode may be smaller than the amount of detergent in the first steam operation mode.

The steam washing pattern may include two or more than two of a water supply step for supplying water to the dishes, a steam supply step for supplying steam to the dishes, and a water/steam supply step for supplying the washing water and the steam at the same time.

The steps included in the steam washing pattern may be performed in succession.

BRIEF DESCRIPTION OF THE DRAWINGS

The accompanying drawings, which are included to provide further understanding of the disclosure and are incorporated in and constitute a part of this application, illustrate embodiments of the disclosure and together with the description serve to explain the principle of the disclosure. In the drawings.

DETAILED DESCRIPTION

Reference will now be made in detail to the specific embodiments of the present invention, examples of which are illustrated in the accompanying drawings. Wherever possible, the same reference numbers will be used throughout the drawings to refer to the same or like parts.

Figure 1:
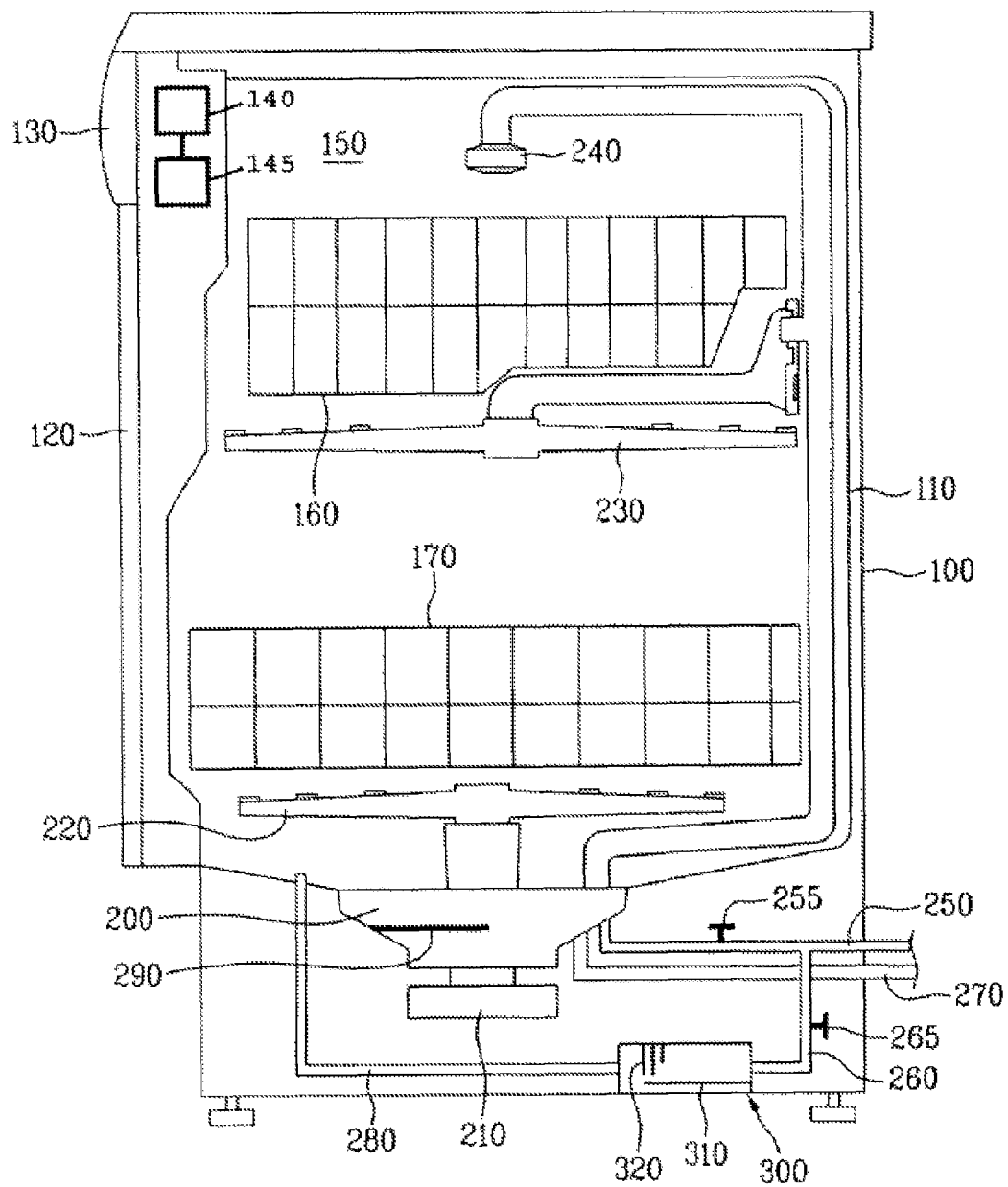
FIG. 1 illustrates of a section of a dishwasher in accordance with a preferred embodiment of the present invention.

The dishwasher of the present invention will be described with reference to FIG. 1. Referring to FIG. 1, the dishwasher includes, for an example, a case 100 which form an appearance of an exterior of the dishwasher, a door 120 for opening/ closing the case 100, and a control panel 130 mounted to the case 100 or the door 120 for a user's operation of the dishwasher.

In the case 100, there is a washing chamber 150, which is a space constructed of a tub 110, for placing the dishes therein and washing the dishes. Under the tub 110, there is a sump 200 for holding washing water.

Mounted to the sump 200 there is a pump 210 for pumping the washing water from the sump 200 and a filter (not shown) for filtering contaminates from the washing water. The sump 200 has a sump heater 290 provided thereto for heating the washing water in the sump 200.

The sump 200 has a first water supply pipe 250 connected thereto for having fresh water supplied thereto from an external water source. The sump 200 also has a drainpipe 270 connected thereto for draining the washing water from the sump 200 to an outside of the dishwasher. The water supply pipe 250 has a first water supply valve 255 mounted thereto for controlling water supply to the sump 200.

Mounted in the tub 100, i.e., in the washing chamber 150, there are at least one shelf, and at least one spray arm for spraying water pumped by the pump 210 to the at least one shelf.

FIG. 1 illustrates an upper shelf 160 and a lower shelf 170, respectively arranged on an upper side and a lower side of the washing chamber 150. FIG. 1 also illustrates an upper spray arm 230 and a lower spray arm 220 for spraying the water pumped by the pump 210 toward the upper shelf 160 and the lower shelf 170, respectively.

In addition to this, there can be a top nozzle 240 arranged at a top side of the washing chamber 150 for spraying the water pumped by the pump 210 from the top of the washing chamber 150 toward the bottom of the washing chamber 150.

In the dishwasher as illustrated, not only is the washing water that is pumped by the pump 210 and sprayed or supplied from spray arms 230, 220 supplied to the washing chamber 150, but also steam is sprayed or supplied to the washing chamber 150. For this, the dishwasher of the present invention includes a steam generator 300, which may operate independently from the sump heater 290 in the sump 210.

Referring to FIG. 1, the steam generator 300 is in communication with the first water supply pipe 250, and in communication with the washing chamber 150 through a steam supply pipe 280. Mounted to a second water supply pipe 260, there is a second water supply valve 265 for controlling water supply to the steam generator 300.

The steam generator 300 may include a steam heater 310 for heating the water supplied to the steam generator 300, and a water level sensor 320 for sensing a level of water within the steam generator 300. The water level sensor 320 can sense, for example, a low water level and a high water level.

The low water level may be set to protect the steam heater 310 in the steam generator 300, and the high water level may be set to protect the water supplied to the steam generator 300 from overflowing.

The steam generator 300 may have a steam supply valve (not shown) mounted thereto for controlling, e.g., opening/closing, the steam supply pipe 280. Such a control may be useful for supplying steam at a desired time.

The dishwasher may have a contamination level sensor (not shown) mounted thereto for measuring a contamination level of the washing water that is washing the dishes. The contamination level sensor may be mounted to one side of the sump 210 for measuring the contamination level of the washing water being circulated through the tub 110.

A control unit 140, which controls the dishwasher, may be operationally connected to electrically operative components, such as a control panel 130, the pump 210, and the steam generator 300, for controlling operation of the dishwasher. The control unit 140 may include a microprocessor that performs control operations. The control unit 140 may have, or be operatively coupled to a memory 145 that has, stored therein, data used by the microprocessor for control operations.

A steam operation mode of the dishwasher can be determined by a user's selection or can be determined based on the kinds of dishes placed in the tub 110. Of course, the operation mode can also be determined according to a degree of contamination of the dishes. That is, in accordance with an embodiment disclosed herein, the dishwasher may have a plurality of steam operation modes. If the steam operation mode is determined, a rotation speed of the motor, a number of repetitions of the steam spraying steps, an amount of detergent, and a steam washing pattern can also be determined, for example, as a function of the determined steam operation mode.

A method for controlling a dishwasher disclosed herein may include a step for performing a first steam operation mode for washing contaminated dishes, and a step for performing the first steam operation mode and a second steam operation mode, which can be performed selectively.

In the first steam operation mode, a first kind of dish is washed, and in the second steam operation mode, second kind of dish is washed. It is understood that the word "dish" as used herein may alternatively be used to refer to a single dish or a plurality of dishes. The first kind of dish may include a category of dishes that may be referred to as general dishware. Such general dishware may be used for having a meal, and may include, for example, tableware, such as dishes, bowls, and so on. The second kind of dishware may include glass cups, particularly, wine glasses, which are susceptible to breakage. The second kind of dishware may also include expensive tableware. That is, the second kind of dishware is that kind which a user may wish to pay special attention.

Of course, classification of the first kind of dishware and the second kind of dishware are not limited to the above. A user may classify his or her dishware as the user desires.

A steam washing pattern may include two of: a water spray step for supplying washing water to the dishes; a steam spray step for supplying steam to the dishes; and a water/steam spray step of supplying both the washing water and steam to the dishes at a the same time. Alternatively, the steps in the steam washing pattern can be performed in succession.

Washing steps in the first steam operation mode and the second steam operation mode will be described with reference to FIGS. 1 and 2. Each of the first steam operation mode, and the second steam operation mode performed in accordance with an embodiment of the invention disclosed herein may include a pre-washing step "P," a main washing step "M," and a rinsing step "R."

The pre-washing step, P, is a step that may be useful for washing dishes with washing water that does not contain detergent. The main washing step, M, is a step that may be useful for washing dishes with washing water that does contain detergent. The rinsing step, R, is a step that may be useful for washing dishes by spraying the washing water onto the dishes that have been washed in the main washing step, M.

At first, in the pre-washing step, P, water supplied to the sump 200 from outside of the dishwasher may be supplied at a low temperature, without heating, to the dishes in the tub 110. The pre-washing step, P, may be useful for removing foreign matters from the dishes, roughly.

In this instance, the water may be supplied to the upper spray arm 230 and the lower spray arm 220 and sprayed onto the dishes, alternately. That is, the water spray steps in the pre-washing step may include an upper-side water spray step for supplying the water through the upper spray arm, and a lower-side water spray step for supplying the water through the lower spray arm. These steps may be performed repeatedly and alternately, for example, at regular intervals. For example, each of the upper-side water spray step and the lower-side water spray step may be performed for one minute.

In this instance, both the steam heater 310 and the sump heater 290 are not in operation. A temperature of the washing chamber 150 into which the washing water is sprayed is the same as the temperature of the water supplied to the sump from the outside of the dishwasher. Of course, the present invention is not limited to above embodiment. For example, heated washing water may be supplied in the pre-washing step, or the detergent may be included in the pre-washing step.

Upon finishing the pre-washing step, P, the main washing step, M, may be performed. In the main washing step, M, the water spray step and the steam spray step may be performed repeatedly and alternately for a predetermined numbers of times, respectively.

The water spray step may serve to remove foreign matter from the dishes, and the steam spray step may serve to soak the foreign matter, for easier/better removal of the foreign matter from the dishes. In the water spray step, the washing water sprayed onto the dishes may be moved between the upper spray arm 230 and the lower spray arm 220, and sprayed repeatedly, and alternately.

In this instance, both the steam heater 310 and the sump heater 290 are not necessarily in operation. Thus, in the instance when the washing water is not heated during the water spraying step, an atmospheric temperature of the washing chamber 150, i.e., the washing temperature, will not rise. Of course, the present invention is not limited to above embodiment. The washing water may be heated during the water spray step.

In the steam spray step, the steam heater 310 may be placed in a turned-on state to generate steam, and the sump heater 290 may be placed in a turned-off state. In the steam spray step, the washing temperature will generally rise.

At the end, in the main washing step, M, the sump heater 290 may be turned off and the steam heater 310 may be turned on/off periodically, to supply the steam and the washing water to the dishes, alternately.

The atmospheric temperature of the washing chamber 150 rises gradually owing to the steam supply. For an example, during the steam supply step, the washing temperature of the washing chamber 150 can have stepped forms in which the washing temperature rises momentarily compared to the temperature in the water supply step.

Figure 2:
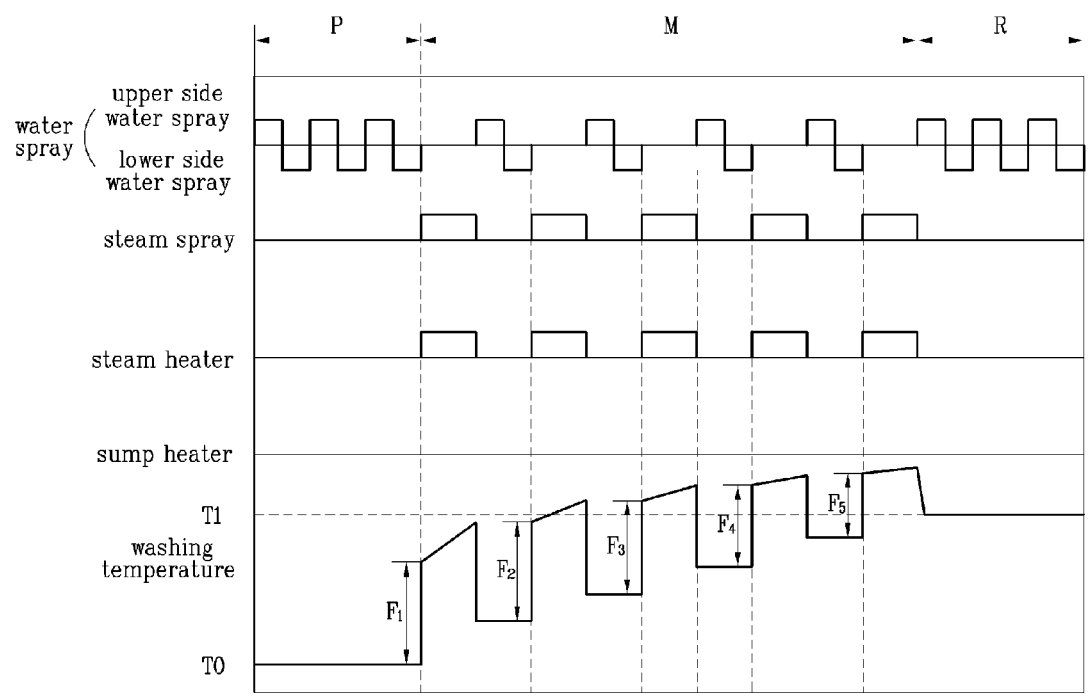
FIG. 2 illustrates a timing chart showing an operation of the dishwasher of FIG. 1, schematically.

Referring to FIG. 2, amounts of temperature rise F1, F2, F3, F4, and F5 in the steam supply steps become smaller, gradually. This is because the washing temperature of the washing chamber 150 has risen to a certain temperature as the steam spray progresses. The influence of the steam spray made thereafter becomes, more or less, weaker. That is, because a temperature difference between the steam and the washing chamber 150 is reduced gradually if the steam spray is performed repeatedly, an amount of heat transfer from the steam to the washing chamber 150 is reduced, gradually.

If the main washing step, M, is finished, the washing water circulated in the tub may be drained through the drainpipe 270 to an outside of the dishwasher. New water may be supplied to the dishes, to start the rinsing step, R. In the rinsing step R, typically, only washing water is supplied to the dishes. Also typically, the washing water is supplied without heating. Even if unheated washing water is supplied to the dishes, the washing temperature of the washing chamber 150 is higher than during the pre-washing step, P. This is because the temperatures of the dishes and the washing chamber 150 have already risen to certain temperatures owing to the main washing step, M.

Of course, in the rinsing step, heated washing water can be supplied, or the washing water and the steam can be sprayed at the same time, or alternately. Moreover, a drying step may be performed once the rinsing step is finished. The drying step may include supplying cold air, or hot air, to the dishes.

Though the first steam operation mode for washing the first kind of dishes and the second steam operation for washing the second kind of dishes have the pre-washing step P, the main washing step M, and the rinsing step R, the rotation speeds of the motor may be set different from one another among the operation modes.

For an example, in a case the rotation speed of the motor is 2500 rpm~2600 rpm in the first steam operation mode, the rotation speed of the motor can be 2000 rpm in the second steam operation mode. That is, the rotation speed of the motor in the second steam operation mode can be set lower than the rotation speed of the motor in the first steam operation mode.

Setting the rotation speed lower acts to reduce the spray pressure of the washing water to the second kind of dishes because the second kind of dishes may be expensive or/and susceptible to breakage.

Even though the first steam operation mode and the second steam operation have the pre-washing step P, the main washing step M, and the rinsing step R, amounts of the detergent used in the modes can be set different from one another.

For example, if the amount of detergent to be used in the first steam operation mode is 20 g, the amount of detergent to be used in the second steam operation mode can be 10 g. That is, the amount of detergent to be used in the first steam operation mode can be smaller than the amount of detergent to be used in the second steam operation mode.

In order to dispose of oil stained dirt cleanly, the detergent for the dishes includes a certain amount of abrasive. Because the dishes suffer from damage if the abrasive is used repeatedly, it is preferable that the washing is performed by using a small amount of the detergent as far as possible. Particularly, because the dishes susceptible to breakage are sensitive to the abrasive, it is desirable that a small amount of the detergent is used in washing the second kind of dishes.

Alternatively, the amount of the detergent may be set in correspondence to the rotation speed of the motor. In detail, once the operation mode is determined, the rotation speed of the motor and the amount of the detergent can be determined, automatically. Of course, the rotation speed of the motor and the amount of the detergent are stored in the control unit 140 for each operation mode in advance.

In the meantime, the number of repetitions of the steam spray step and the water spray step in the second steam operation mode can be smaller than the number of repetitions of the steam spray step and the water spray step in the first steam operation mode. Of course, if the time periods required for the steam spray step and the water spray step are the same, an operation time period required for the main washing step in the second steam operation mode can be shorter than the operation time period required for the main washing step in the first steam operation mode.

The smaller the number of repetitions, the smaller the damage to the second kind of dishes. Of course, in order to wash the dishes, the number of repetitions is required to be greater than certain a predetermined number.

In the meantime, a method for controlling a dishwasher may include a step for performing a third steam operation mode having a washing step different from the first steam operation mode, even though the dishwasher washes the first kind of dishes. In this instance, the first steam operation mode, the second steam operation mode, and the third steam operation mode can be performed, selectively.

Figure 3:
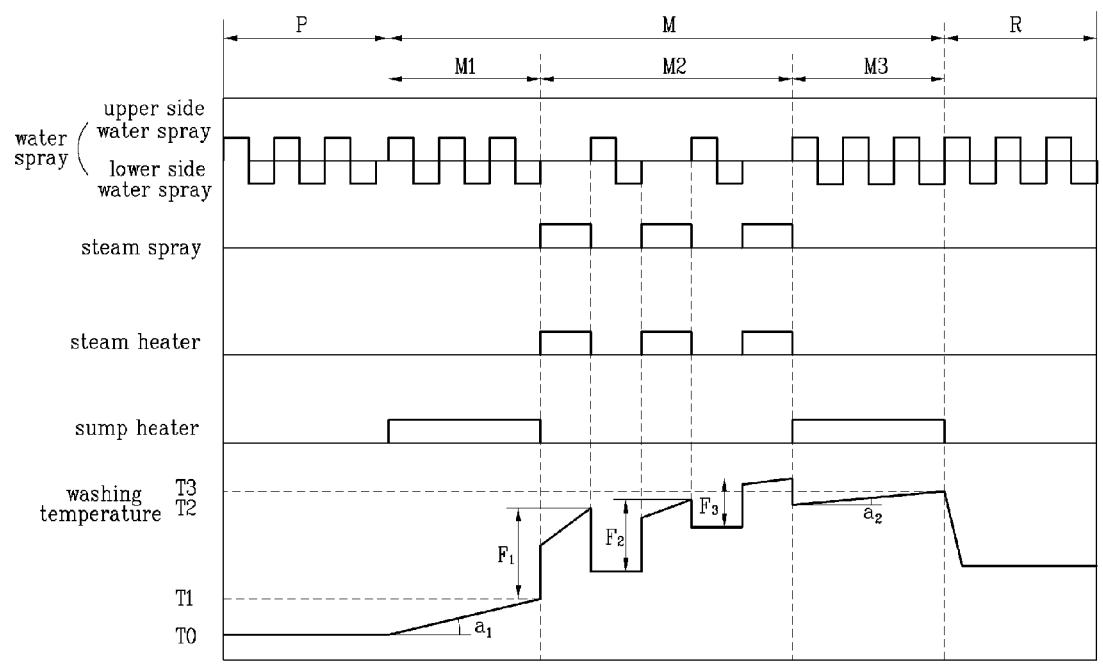
FIG. 3 illustrates a variation of a timing chart showing an operation of the dishwasher of FIG. 1, schematically.

The third steam operation mode will be described with reference to FIGS. 1 and 3.

The third steam operation mode is an operation mode having a washing step for enhancing a washing performance on the first kind of dishes. In detail, different from the first steam operation mode and the second steam operation mode, the third steam operation mode includes main three washing steps.

That is, the main washing step M includes a first main washing step M1 for spraying heated washing water to the dishes, a second main washing step M2 for spraying steam and washing water to the dishes alternately, and a third main washing step M3 for spraying heated washing water to the dishes.

In the first main washing step M1, the washing water, which is heated with the sump heater 290 for a first set time period after the pre-washing step P is finished, is supplied to the dishes. In detail, the washing water heated by the sump heater 290 is pumped to the upper spray arm 230 and the lower spray arm 220 and sprayed to the dishes repeatedly and alternately.

In this instance, the steam heater 310 is in a turned off state, and the first set time period is stored in the control unit 140 in advance.

In the meantime, the sump heater 290 heats the washing water, and the heated washing water is sprayed to the dishes in the washing chamber 150, to elevate the atmospheric temperature of the washing chamber 150, i.e., the washing temperature. As shown, the washing temperature of the washing chamber 150 can form a linear graph during the first main washing step.

In the second main washing step M2, the steam and the washing water are supplied for a second set time period after finish of the first main washing step M1, alternately. In other words, the steam spray step for supplying the steam to the dishes and the water spray step for supplying the washing water to the dishes are performed for a preset number of times, repeatedly and alternately.

Since a detailed description of the second main washing step is the same with the main washing step described with reference to FIG. 2 substantially, the detailed description will be omitted.

In the third main washing step M3, the washing water, which is heated by the sump heater 290 during a third set time period after the second main washing step M2 is finished, is supplied to the dishes.

In detail, the washing water, which is heated with the sump heater 290, is pumped to the upper spray arm 230 and the lower spray arm 220, and sprayed to the dishes, alternately. In this instance, the steam heater 310 is in a turned off state.

In the meantime, the washing water, which is heated with the sump heater 290, is supplied to the washing chamber 150 to elevate the washing temperature of the washing chamber 150. In this instance, a characteristic of only supplying heated water in the third main washing step M3 is the same as in the first main washing step M1. However, the washing temperature of the washing chamber 150 in the third main washing step M3 is higher than the washing temperature of the washing chamber 150 in the first main washing step M1. This is because the temperatures of the dishes and the washing chamber 150 are already elevated to a certain temperature in the second main washing step M2.

Moreover, a second slope a2, which indicates an amount of change of the washing chamber 150 temperature in the third main washing step M3, has a value smaller than a first slope a1, which indicates an amount of change of the washing chamber 150 temperature in the first main washing step M1.

That is, under the assumption that operation time periods of the first main washing step M1 and the third main washing step M2 are the same, the amount of temperature change T1-T0 in the first main washing step is greater than the amount of temperature change T3-T2 in the third main washing step.

This is because the washing chamber 150 temperature in the third washing step M3 has already been elevated to a temperature greater than in the first washing step M1. Thus, the change in temperature of the washing chamber 150 as influenced by the washing water heated by the sump heater 290 is relatively smaller in the third washing step M3 in comparison to the first main washing step M1.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The method for controlling a dishwasher of the present invention has the following industrial applicability.

First, the plurality of steam operation modes, which are operative selectively and have different motor rotation speeds permit efficient washing. For example, the reduction of impact, to be applied to the fragile dishes/expensive dishes by operation of the motor at a lower rotation speed of the motor, permits safe washing of these types of dishes.

Second, the plurality of operation modes, which are operative selectively and require different amounts of detergent, permit an efficient washing of the dishes. For example, the use of a small amount of detergent for expensive dishes permits a reduction in the amount of possible damage to these dishes from application of the detergent to the dishes.

Third, the performance of the washing step based on any kind of dishes permits a reduction in power consumption.

We claim:

1. A method for controlling a dishwasher comprising:
   selecting a steam operation mode for washing dishes between a first steam operation mode and a second steam operation mode by user's selection, wherein the first steam operation mode is for general dishes, the second steam operation mode is for more fragile dishes than the general dishes;
   wherein the second steam operation mode repeats the steam supply step fewer than a number of repetitive times in a steam supply step in the first steam operation mode, and
   wherein a number of repetitive times in the steam supply step for each steam operation mode is pre-determined before one of the steam operation modes is selected.

2. The method according to claim 1, further comprises determining an operation time period based on the determined steam operation mode,
   wherein the second steam operation mode operates shorter than an operation time period of the first steam operation mode.

3. The method according to claim 1, wherein the second steam operation mode supplies steam smaller than an amount of steam supplied in the first steam operation mode.

4. The method according to claim 1, further comprises determining an amount of detergent based on the determined steam operation mode,
    wherein the second steam operation mode uses the amount of detergent smaller than the amount of detergent in the first steam operation mode.

5. The method according to claim 4, wherein the number of repetitive times is determined corresponding to the amount of detergent or the motor rotation speed.

6. The method according to claim 4, further comprises determining a motor rotation speed based on the determined steam operation mode,
    wherein the amount of detergent is determined corresponding to the motor rotation speed.

\* \* \* \* \*